United States Patent
Johnson et al.

(10) Patent No.: US 6,419,215 B1
(45) Date of Patent: Jul. 16, 2002

(54) BI-COMPONENT BUSHING

(75) Inventors: David H. Johnson, Ligonier, IN (US); Patrick T. Kolb, Bloomfield Hills, MI (US)

(73) Assignee: Freudenberg-Nok General Partnership, Plymouth, MI (US)

(*) Notice: Subject to any disclaimer, the term of this patent is extended or adjusted under 35 U.S.C. 154(b) by 0 days.

(21) Appl. No.: 09/630,858

(22) Filed: Aug. 2, 2000

Related U.S. Application Data
(60) Provisional application No. 60/156,211, filed on Sep. 27, 1999.

(51) Int. Cl.$^7$ .............................. F16F 13/00; B60G 11/22
(52) U.S. Cl. .................. 267/292; 267/140.12; 267/219; 267/140.3
(58) Field of Search ........................ 267/140.12, 219, 267/220, 136, 140.2, 140.3, 104.4, 104.5, 141–141.7, 153, 292, 293, 294; 188/378–380; 180/312; 248/562, 636, 638, 635; 403/225, 222, 226; 280/124–177

(56) References Cited

U.S. PATENT DOCUMENTS

| | | | |
|---|---|---|---|
| 4,288,063 A | | 9/1981 | Brenner et al. |
| 4,673,314 A | * | 6/1987 | Hara et al. ............... 267/140.3 |
| 4,706,946 A | * | 11/1987 | Thorn et al. ................ 267/292 |
| 5,040,774 A | * | 8/1991 | Veverka et al. |
| 5,058,867 A | | 10/1991 | Hadano et al. |
| 5,154,403 A | | 10/1992 | Sato |
| 5,718,407 A | | 2/1998 | Lee |
| 5,788,209 A | | 8/1998 | Dandre et al. |
| 5,884,902 A | * | 3/1999 | Hamada et al. ............. 267/141 |

* cited by examiner

Primary Examiner—Douglas C. Butler
(74) Attorney, Agent, or Firm—A. Michael Tucker; Casimir R. Kiczek

(57) ABSTRACT

A bushing is disclosed with a sleeve. The sleeve member has an inner surface and a cavity. A core member is disposed in the cavity. A pair of elastomeric members are disposed in the cavity. One of the pair of elastomeric members is adjacent to the core. The other of the pair of elastomeric members is adjacent to the inner surface. The one of the pair of elastomeric members has a modulus that is greater than the other of the pair of elastomeric members so that one of said pair of elastomeric members absorbs low frequency vibration and the other of the pair of elastomeric members absorbs high frequency vibration.

20 Claims, 4 Drawing Sheets

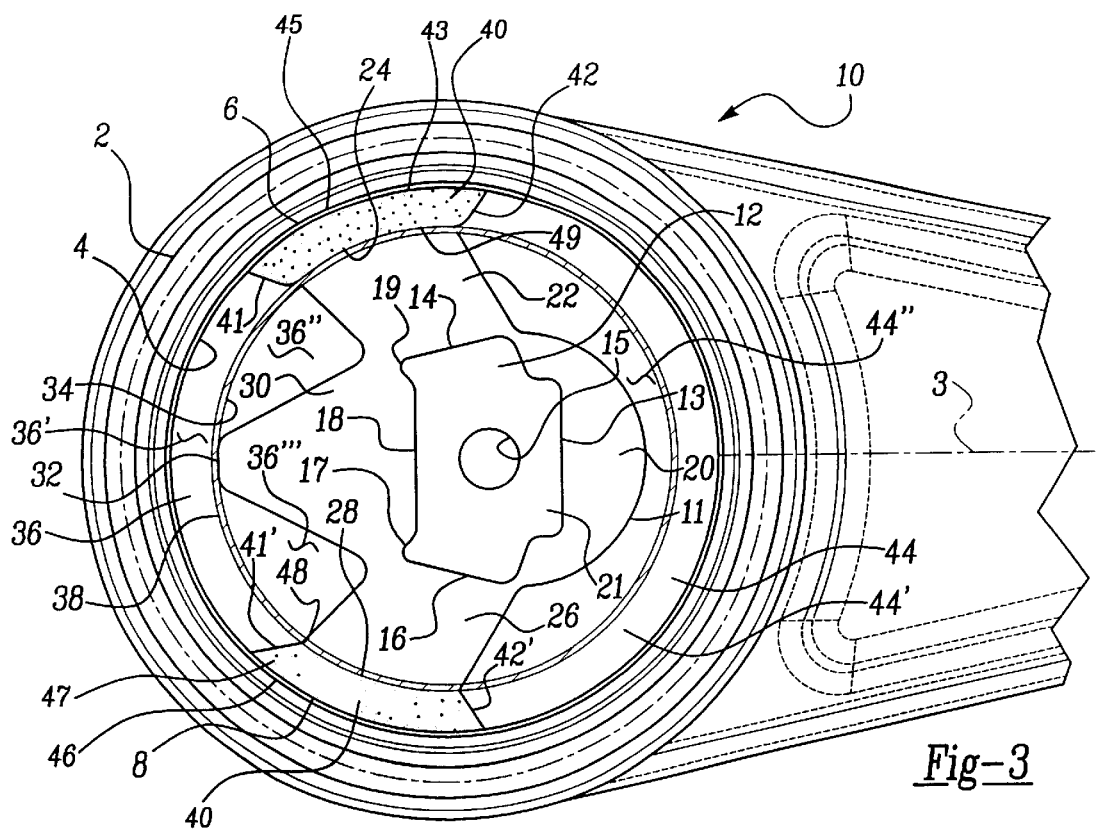

BI-COMPONENT BUSHING

This application claims priority from provisional application Ser. No. 60/156,211 filed Sep. 27, 1999.

FIELD OF THE INVENTION

The present invention generally relates to an elastic bushing or mount for vehicles and specifically in a coupling portion of a vehicle such as suspension bushing which attenuates or dampens vibrations and shock forces.

BACKGROUND OF THE INVENTION

Rubber isolation isolators for vehicles take the form of powertrain mounts, front and rear suspension bushings and differential mounts or the like to isolate the transmission of road induced vibratory forces into the vehicle or to isolate vibratory forces induced from the powertrain. Conventional cylindrical vibration damping bushings for suspension systems which are generally made of a rubber member are well known in the prior art.

In an automobile, the rubber isolator is primarily in shear mode for low load displacements. However, as the load on the rubber isolator increases dramatically, the shear capacity of the rubber member may be exceeded and to prevent this, the isolator has a rubber stop portion which becomes loaded in compression to assist the rubber mount to absorb the load and limit the shear load on the rubber isolator member. This generally creates a discontinuity in the load absorbing characteristics of the mount such that the vehicle operator will notice a sudden shift in load absorbing characteristics. This is undesirable in today's vehicles and many approaches have been taken to try and solve the problem.

One approach used to solve this problem is the use of hydraulic isolation mounts. Such devices use an annular rubber block and an annular rubber diaphragm. The annular parts are provided with at least two recesses, and are configured and assembled such that the recesses complement one another to form first and second fluid-filled working chambers. The chambers are sealed with respect to the environment and joined to one another, in a manner allowing fluid to pass, by at least one damping passage. High frequency, low amplitude vibration is absorbed by the rubber block. Low frequency, high amplitude forces cause the liquid in the main chamber to move into an auxiliary chamber to absorb these forces. While this influences the force versus displacement response of a particular design, such approaches have not solved the basic problem of isolating vibratory forces over a broad vibration spectrum, and they have been found to be expensive to make.

Another approach used in the prior art is the use of a hydro-bush. An example of such a device is U.S. Pat. No. 5,503,376. The hydro-bush is a hydraulically dampened rubber spring sleeve containing two annular parts. However, it is difficult to decouple the vibration forces and thus these devices have limited use. The isolation capabilities are limited and are dependent on the solid elastomeric properties of the rubber block.

Other approaches have generally focused on lowering the friction co-efficient on the rubber surface such as by adding wax into the rubber composition or adding liquid silicone oil into the rubber composition or the like. However, it is found that the degree to which the friction co-efficient is decreased is usually not significant enough to dampen vibration over the entire frequency spectrum and such approaches are effective only within narrow temperature ranges. Thus, there is a need to provide a low cost, simple but effective solution to this problem.

SUMMARY OF THE INVENTION

The present invention is drawn to a bushing which solves this problem. The bushing includes a bracket with a cavity, the cavity having an inner surface. A core member is disposed in the cavity. A pair of elastomeric members are between the core and the inner surface. One of the pair of elastomeric members having a modulus that is greater than the other of the pair of elastomeric members so that one of the pair of elastomeric members absorbs higher amplitude and lower frequency vibration and the other of the pair of elastomeric members absorbs low amplitude and high frequency vibration.

A primary object of the present invention is to use a volume incompressible material and volume compressible material to make a bushing.

Another object of the present invention is to employ foamed elastomer as a vibration isolator which is also an assembly aid to simplify the manufacturing process.

A still further object of the present invention is to use a pair of elastomeric members of which one is a solid elastomer to absorb low frequency and high amplitude vibration and the other is a foamed elastomer to absorb high frequency and low amplitude vibration.

These and other features of the present invention will become apparent upon consideration of the following description and the appended claims with reference to the accompanying drawings all of which form part of the specification.

BRIEF DESCRIPTION OF THE DRAWINGS

FIG. 3 is a side view of an optional, alternative embodiment shown in FIG. 2;

FIG. 4 is a side view of the preferred embodiment of the present invention;

DETAILED DESCRIPTIONS OF THE EMBODIMENTS

The present invention is directed to a solution to the above problem. Foamed elastomers are volume compressible, that is capable of absorbing an applied force in both shear and compression modes. This is because a foamed elastomer has many cells which are filled with gas cavities. These cells are evenly distributed through the polymer matrix. Due to its volume compressibility property, foamed elastomers are capable of much higher deflection than comparable solid rubber products. In some instances, foamed elastomeric cylinders can absorb deflections of up to 85% of their original height. Another favorable characteristic of foamed elastomers is their ability to vary elastic modulus by adjusting the density of the material. This allows the designer to tailor the vibration isolation characteristics of the system by varying the density of the foamed elastomer.

One such foamed elastomer is preferably microcellular polyurethane (MCU). In addition to its vibration-isolation characteristics, MCU can be used to simplify the assembly process of the subcomponents, which includes a rubber component in a bracket or strut, by integrating the components and joining them together when the in situ chemical reaction to form MCU is initiated and completed. Components are integrated into the assembly by a mechanical interlocking of the MCU as the foam expands against the other components, or alternatively by chemical bonding of the MCU as is well known in the art.

Figure 1:
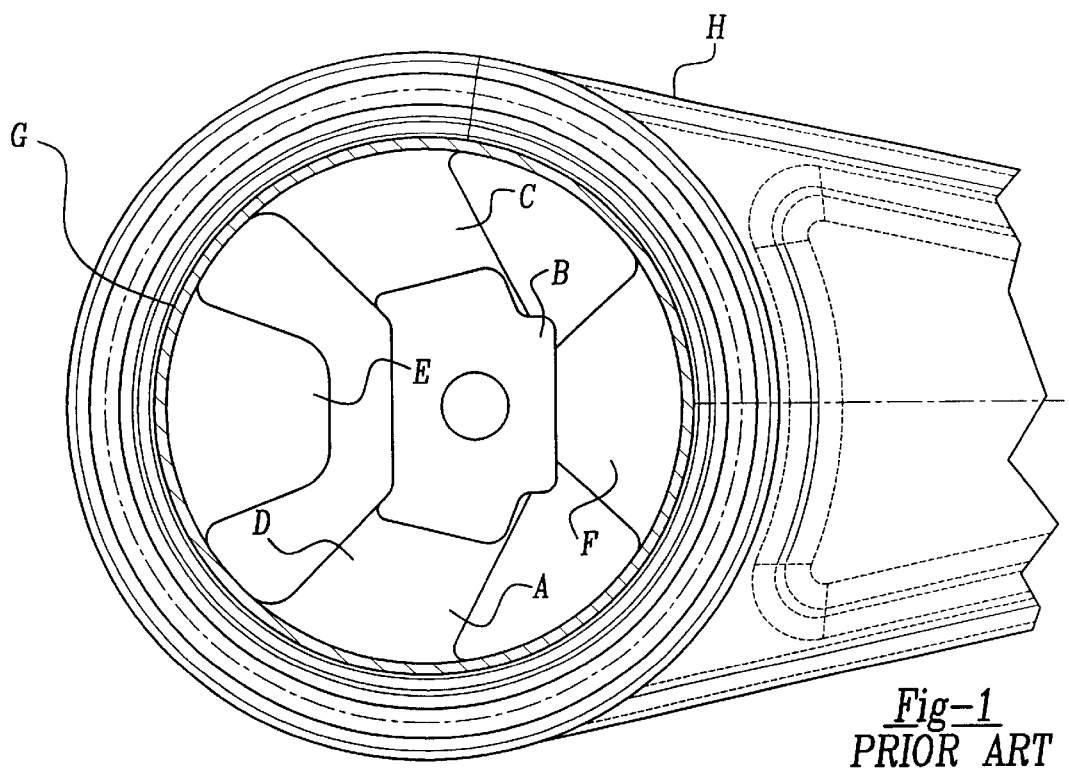
FIG. 1 is a side view of a conventional suspension bushing.

As stated earlier, conventional cylindrical vibration damping bushings for suspension systems are made of solid rubber, as is well known in the prior art, and as shown in FIG. 1. A vibration damping rubber body A is molded and bonded to a metal core B and sleeve G with conventional rubber to metal adhesive techniques. The rubber body A includes a pair of legs or wings C, D which extend from the metal core B to the sleeve G. The rubber body A also includes a first bumper stop section E which extends from the sleeve G towards but spaced away from the metal core B and a second bumper stop section F which extends from the sleeve G to the metal core B. The rubber body A is inserted into a cylindrical bracket or strut H by means of mechanical crimping of the sleeve or an interference fit of the sleeve and the inside diameter of the bracket. The sleeve and bracket or strut must be machined or made to tight tolerances in order to join the sleeve to a bracket or strut. However, since rubber is generally incompressible, any force applied to the rubber generally results in a shape change. Thus, when using a rubber body in a bushing, great care must be taken to provide space in the sleeve, and the bracket hoop must be sized to a close tolerance to permit the rubber to change shape under compression or shear loads which can further complicate the design process. As a result, conventional bushings are complicated to design, difficult to process and require a large package envelope.

Since rubber is generally incompressible, and generally has a Poisson's Ratio of nearly 0.5 in compression, the modulus of elasticity of solid rubber is generally higher than foamed elastomers. Since foamed elastomers can deform in both shear and compression, they generally have Poisson's Ratio between 0 to less than 0.5 in compression. Foamed elastomers are also highly compressible. This is due to the open cell structure in the foamed elastomer. Generally, the open cells in the foamed elastomer range from 35 to 65 percent.

Foamed elastomers have the capacity for higher dynamic amplitude loading and low dynamic rate, that is it is "soft", and it has high fatigue-to-failure characteristics, when used in compression. Thus, by using both a solid rubber member and an foamed elastomer member in a bushing, an added benefit is obtained in that the vibration characteristics of the bushing or mount can be tailored to meet the specific application requirements. The solid rubber can be tuned by changing its hardness and shape, while a foamed elastomer can be tuned by changing its density and shape. The foamed elastomer can be utilized for isolation for low amplitude or low displacement conditions and high frequency conditions while solid rubber can be used for isolation for high amplitude or high displacement conditions and low frequency conditions. The vibration absorption of both materials can be tuned to work in conjunction with each other to isolate the ranges of vibration frequencies and amplitudes of vibration that exist in the application. The introduction of a second vibration damping material, that is a foamed elastomer, in a rubber vibration-damping bushing, results in an additional degree of freedom for a designer, that is, it adds another variable that can be used for fine-tuning vibration isolation. The dual material design results in a force versus displacement characteristics that can be tailored to meet many vibration application requirements.

For example, in one possible design condition, the respective vibration damping characteristics are shown below.

|  | Frequency | Amplitude |
| --- | --- | --- |
| MCU | High | Low |
| Rubber | Low | High |

Figure 2:
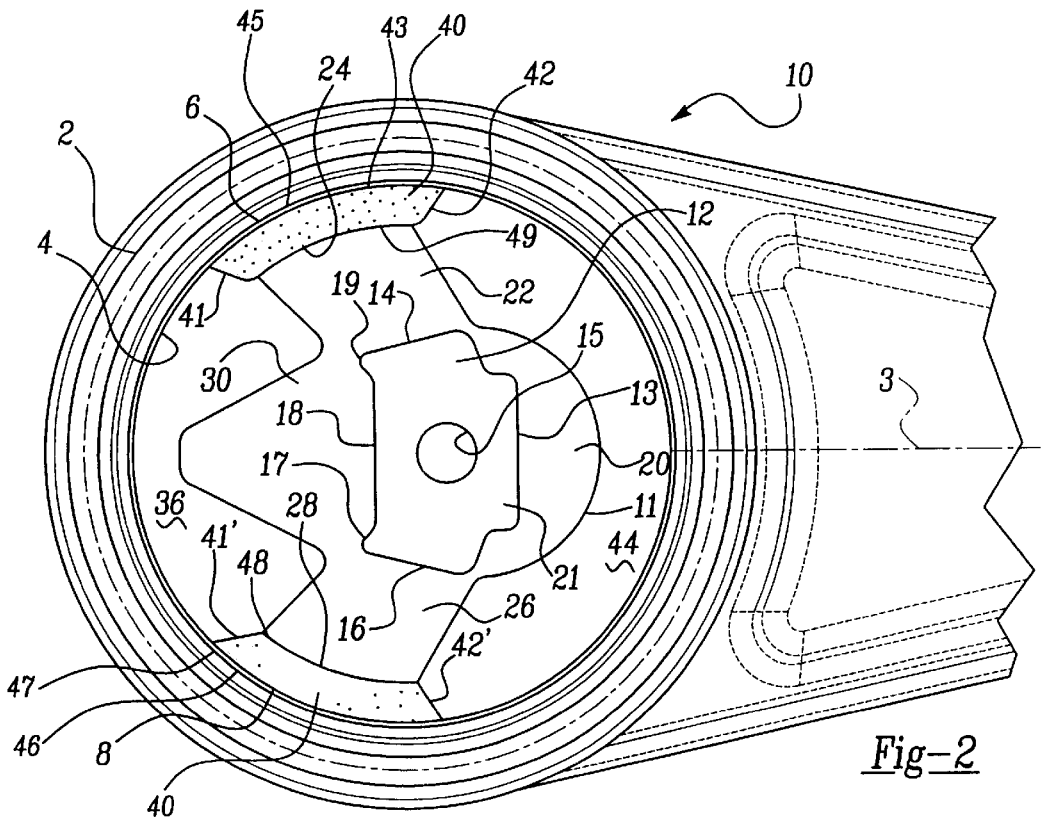
FIG. 2 is a side view of an alternative embodiment of a suspension bushing according to the present invention.

As shown in FIG. 2, the bushing according to the present invention is designated by the numeral 10. The bushing 10 includes a composite or metal bracket or strut 2 with an inner diameter 4. The bushing 10 also has a core member 12 which has a through hole 15 formed in it. The core member 12 has sides 14, 16 and a surface 18 connecting side 14 to side 16. At the intersection of 14 and 18, there is a rounded corner 19 and similarly at the corner of 18 and 16 there is a similar rounded corner 17. A first elastomeric member 20 is bonded to the core 12 by rubber to metal bonding techniques well known in the prior art. Alternatively, or additionally, mechanical locks such as holes, fingers, slots, projections or similar features, to hold the elastomer to the core 12 or to any other surface which contacts an elastomer, may be employed in practicing the invention. The first elastomeric member 20 has one segment or leg 22 which is bonded to surface 14 of the core 12 and another segment or leg 26 which is bonded to the surface 16 of the core member 12. Between the segments or legs 22, 26, an elastomeric projection 30 is formed and is adjacent to surface 18 and extends toward but is spaced away from the inner diameter 4. Opposite to surface 18 is a surface 13 on the core 12 to which an arcuate stop 11 is bonded and is connected to legs 22, 26 respectively. The arcuate stop 11 is spaced away from the inner diameter 4 of the strut 2. The leg 22 has an arcuate surface 24 and similarly, leg 26 has an arcuate surface 28 formed therein. In between the inner diameter 4 of the bracket or strut 2, and the arcuate surfaces 24, 26, respectively, of the first elastomeric member 20, a second elastomer member 40 is formed. The second elastomeric member 40 has at least two portions 43, 47, respectively. The first portion 43 has an outer diameter 45 which is bonded and in intimate contact to the inner surface 4 of the strut 2. Additionally, the second portion 47 has an outer diameter 46 which is in intimate contact with the inner diameter 4 of the strut 2. Both portions 43, 47, respectively, of the second elastomer 40 are bonded at their outer diameters 45, 46, respectively, to arcuate segments 6, 8, respectively, of the bracket 2. Additionally, the portions 43, 47, respectively, of the second elastomer 40 have inner surfaces 48, 49, respectively, which are bonded to the arcuate surface 28, 24, respectively, of the first elastomer member 20. Thus, the strut 2 is formed with two elastomeric members 20, 40, respectively, which are located between the core 12 and the strut 2. Portion 43 has sides 41 and 42 and portion 47 has sides 41' and 42'. The bushing 10 thus described has a fist void portion 36 between the inner diameter 4 and the projection 30 and a second void portion 44 between the inner diameter 4 and the arcuate stop 11. The advantage of this design is that vibration absorption characteristics of both the first and second elastomeric members 20, 40, respectively, are integrated into the bushing 10.

Preferably, the first elastomeric member 20 is made of solid rubber such as natural rubber, isoprene, styrene-butadiene, butyl, ethylene-acrylate, polyacrylate, fluorocarbon and any other elastomeric material suitable for use in such applications. The second elastomeric member 40 is preferably a foamed elastomer such as foamed fluorocarbon, foamed highly saturated nitrite, methyl acrylate polymer foam, silicone foam, EPDM foam, Neoprene® foam microcellular polyurethane or any other material suitable for practicing the invention. Neoprene® is a registered trademark of DuPont. The foamed elastomer can be formed with the first elastomeric member 20, core 12 and strut 2, hereinafter referred to as "components", in a locating fixture in the mold and the second elastomer member 40 is then introduced into the mold so as to join and assemble the components to the second elastomer member 40 and the strut 2 at the molding station.

As stated earlier, preferably the foamed elastomer is MCU. MCU is a polymer product obtained from the interaction of diisocyanate glycol and a blowing agent. The glycol is usually a polyol which can be of either the polyester or polyether type. Polyesters and Polyethers generally have hydroxyl groups that are free to react with isocyanate.

The isocyanate also reacts with water to produce carbon dioxide gas for foaming. Foam density is determined by the quantity of water present in the formulation and is characterized by the weight of the polyurethane material divided by the overall volume.

Once intimately mixed, the ingredients are discharged from the mixer and deposited into a mold where complex chemical reactions take place. The reactions are primarily exothermic which converts the liquid into a foam. This technology is known in the prior art. See *Rubber Technology, Third Edition*, edited by Maurice Morton-Van Norstand Reinhold, ISBN 0-442-2642204, pages 555–60, which is incorporated herein by reference. The damping characteristics of a microcellular polyurethane foam are affected by the amount of gases trapped in the body of the polyurethane. Thus, the stiffness, and the spring rate characteristics of the microcellular polyurethane can be adjusted to meet specific application requirements. Microcellular polyurethane foam density is typically 0.3 to 0.7 grams per cubic centimeter although optionally, the range can be extended to 0.8 grams per cubic centimeter. The spring rate of the microcellular polyurethane can also be modified by the geometric shape of the component and material density.

In operation, the bushing 10 moves along the longitudinal axis 3 of the bracket 2, and attenuates vibration and amplitudes along the axis 3. It also attenuates in the transverse axis which is 90 degrees from the longitudinal axis 3. If a conical shape is employed, the bushing attenuates in all 3 axes that is, along the longitudinal axis 3, along the transverse axis and along the depth or thickness axis of the bushing 10 which is 90 degrees from both the longitudinal axis 3 and the transverse axis. Additionally, this embodiment of bushing 10 eliminates the need for a cylindrical sleeve which is required in conventional bushings since the elastomeric members fill in the space between the inner diameter 4 of the bracket 2 and the core 12. This is accomplished by integrally bonding the first and second elastomeric members, respectively, and the core and strut together in one operation thereby eliminating the sleeve and the need for an interference fit or mechanical crimping as required by conventional solid rubber bushings. Thus, the first elastomer member may be encapsulated into the second elastomer and vice versa. Optionally or additionally, a mechanical lock may be used to connect the components together, as described earlier.

In another alternative embodiment, as shown in FIG. 3, an annular ring or sleeve member 38 with an inner diameter 34 and an outer diameter 38 is positioned in between the first elastomeric member 20 and the second elastomeric member 40. Where the elements are the same as described in the embodiment of FIG. 2, the numerals remain the same. The annular ring 38 acts as a physical link between the first and second elastomeric members 20, 40 and may optionally or additionally include perforations, apertures or projections to mechanically lock the first elastomer 20 and the second elastomer 40 to the annular ring 38. Additionally, the annular ring 38 acts as a rate plate which influences the isolation characteristics of the first and second members 20, 40, respectively, as compared to the isolation characteristic if the annular ring 38 were absent. The ring 36 may be formed of ferrous or non-ferrous materials or polymeric materials such as thermoplastics including nylon or thermoset plastics such as polyester or vinylester materials. Because of the annular ring or sleeve member 38, the voids 36 and 44 are modified accordingly. Thus, the first void portion 36 is split into three cavity segments 36', 36" and 36'" and the second void portion 44 is split into two cavity segments 44' and 44". In all other aspects, the embodiment in FIG. 3 is the same as the embodiment shown in FIG. 2.

Those skilled in the art will recognize that optionally, the bushing 10 may be made where the first elastomeric member 20 and the second elastomeric member 40 are reversed. Thus, the first elastomeric member 20 may be made of a foamed elastomer or similar material as described previously, and the second elastomeric member 40 may be made of a solid rubber such as natural rubber, butyl, isoprene, styrene butadiene, ethylene-acrylate, polyacrylate, fluorocarbon, fluoropolymer, thermoplastic elastomer or other similar material suitable for the application.

The preferred embodiment of the invention is shown in FIG. 4 and is designated by the numeral 50. Where the elements are the same as described in the embodiment 10, the numerals will remain the same.

The bushing 50 includes a strut 2 with an inner diameter 4. The bushing has a core member 12 with a through hole 15, sides 14, 16 and surface 18 connecting sides 14, 16, respectively, with arcuate corners 19, 17 formed thereon as described earlier. The bushing 50 has one elastomeric member 60 with four sections. The sections are: the first section 61, the second section 62, a stop section 72 and a bumper section 74. These elements will be described in detail below:

The other elastomeric member 80 is in the form of an annulus and is adjacent to the inner diameter 4 of the strut 2. Thus, the member 80 has an outer diameter 82 and an inner diameter 84. The outer surface 87 of the sleeve 86 is adjacent to the inner diameter 84 of the second elastomeric member 80. The sleeve 86 also has an inner diameter 88. The annular sleeve or member 86 may be formed of ferrous or non-ferrous materials or polymeric materials such as plastics as previously described. The sleeve 86 acts as a physical link between the first elastomeric member 60 and second elastomeric member 80 and may optionally or additionally include perforations, apertures or projections to lock the one elastomeric member 60 to the sleeve 86 and the other elastomeric member 80 to the sleeve 86, similar in all other respects to the ring member 38 in FIG. 3.

The first section 61 is formed between the inner diameter 88 of the sleeve 86 and the one side 14 of the core 12. The second section 62 is formed between the inner diameter 88 of the sleeve 86 and the other side 16 of the core 12. The core 12 is thus connected by the first and second sections 61, 62, respectively, to the sleeve 86.

The bumper section 74 is between the core 12 and the annular sleeve member 86. The surface 73 of the bumper section 74 is adjacent to the surface 13 of the core 12. A hole 75 is formed in the bumper section 74. Preferably, the bumper section 74 is in unbonded contact with the core. The outer arcuate segment 76 of the bumper section 74 is connected or bonded to the inner diameter 88 of the annular sleeve member 86. Alternatively, the bumper section is connected to the core 12 and the annular sleeve member 86 by adhesive or a mechanical lock.

Adjacent to but spaced away from the surface 18 of the core 12 is the stop section 72. The stop section 72 is attached to the inner diameter 88 of the sleeve 86. The stop section 72 forms a projection 78 that extends toward surface 18 but is normally spaced away from it. The stop section 72 is formed between the first section 61 and the second section 62.

The preferred embodiment also takes advantage of the vibration absorption characteristics of both the one elastomeric member 60 and the other elastomeric member 80.

Preferably, the one elastomeric member 60 is made of solid rubber such as natural rubber, styrene-butadiene rubber, isoprene, butyl, ethylene-acrylate, polyacrylate, fluorocarbon or other similar polymers suitable for the application. The other elastomeric member 80 is made of a foamed elastomer as previously discussed and preferably a foamed microcellular polyurethane (MCU). Optionally, the one and the other elastomer members 60, 80, respectively, may be reversed. Thus, the first elastomeric member 60 may be made of a foamed elastomer whereas the other elastomeric member 80 may be made of a solid rubber.

Figure 5:
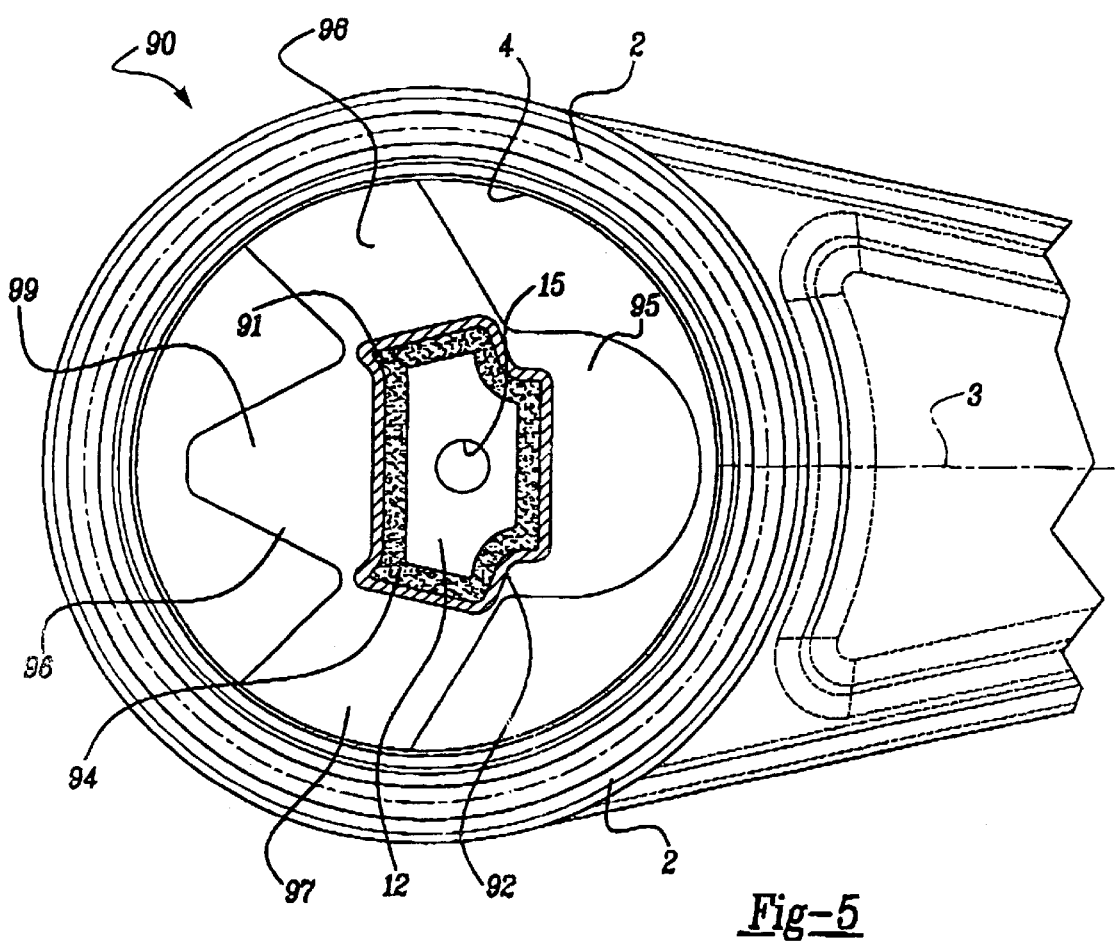
FIG. 5 is a side view of another alternative embodiment of the present invention.

Another alternative embodiment of the invention is shown in FIG. 5 and designated by the numeral 90. Where the elements are the same as described in the first embodiment 10, the numerals remain the same.

The bushing 90 includes a core 12, and disposed about it is a similar shaped but larger contoured ring 92 which is spaced away from the core 12. In between the core 12 and the inner wall 91 of the ring 92, a third elastomeric member 94 is molded there between. The third elastomer 94 is bonded to the core 12 by conventional elastomer to metal adhesive technology and to the ring 92 as well. Optionally, the ring 92 may be made of metal such as steel, aluminum, magnesium or a polymeric material such as a plastic or any other material suitable for such applications. Where the ring 92 is made of plastic, a suitable elastomer to plastic adhesive is employed as is well known in the art or alternatively, or in addition, a mechanical lock as described previously, is employed.

The outer periphery of the ring 92 is connected to the inner diameter 4 of the strut 2 by a fourth elastomeric member 96. The sixth elastomeric member 96 includes an arcuate stop member 95, a first leg 97, a second leg 98 and a projection 99.

The fourth elastomeric member 96 is bonded by a conventional adhesive to the ring 92 and the inner diameter 4 of the strut 2. Preferably, the third elastomeric member 94 is a foamed elastomer as previously discussed and the fourth elastomeric member 96 may be a solid rubber. Optionally, the third and fourth elastomeric members 92, 96, respectively, may be reversed where the member 92 is made of solid rubber and the member 96 is made of a foamed elastomer, depending on the vibration characteristics sought to be isolated.

Figure 6:
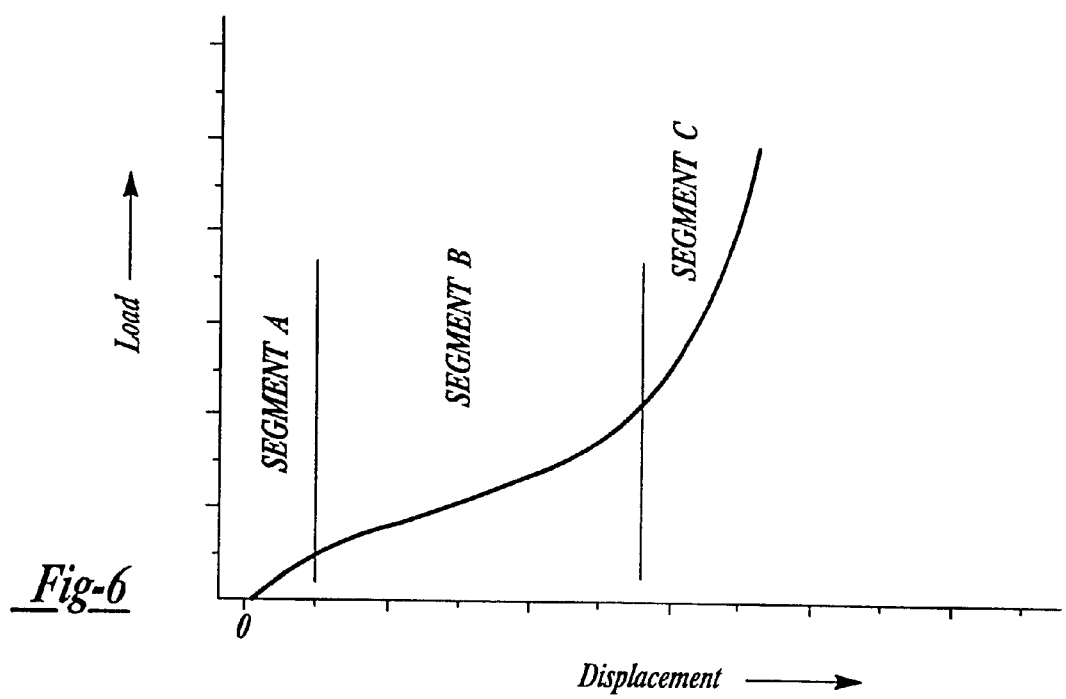
FIG. 6 is a typical curve of load versus displacement of a foamed elastomer.

As stated earlier, solid elastomers are well known in the art. In general, they have good vibration isolation characteristics for high amplitudes and low frequency. On the other hand, foamed elastomers have in general low amplitude and high frequency vibration absorption characteristics. Thus, combining them into a bushing permits the bushing to absorb both high and low amplitude vibrations, and low and high frequency vibration characteristics and provide better isolation characteristics then known prior art devices. Foamed elastomers also have an additional characteristic that is different from that of solid elastomers, as shown in FIG. 6. Generally, solid elastomers have a stress value that increases at a substantially linear rate for strain values less than 40%. Foamed elastomers, on the on the other hand, have a stress value that increases at a substantially linear rate for strain values that are 40% or beyond. Foamed elastomers also have load absorption versus displacement characteristics that have three phases. In the first phase, the load absorption characteristic of a foamed elastomer increases with increasing load until a peak is reached. In the next phase, called the "soft phase", the load absorption increases slowly with increasing displacement. The "soft phase" continues until all the cells in the foamed elastomers are collapsed upon themselves. In the final phase, the load absorption characteristic increases substantially with increasing displacement. This characteristic of foamed elastomers provides the designer with design choices that heretofore were not available with solid elastomers. Thus, a foamed elastomer permits better tailoring of the vibration characteristics to the specific application.

While it will be apparent that the preferred and alternative embodiments of the disclosed invention fulfills the objectives and benefits of the invention, it will be appreciated that the invention is susceptible to modification without departing from the proper scope of the appended claims.

We claim:

1. A bushing for isolating and dampening vibrations comprising:
   a core having an outer surface;
   sleeve surrounding the outer surface of the core, the sleeve having an inner diameter surface and an outer diameter surface;
   a first elastomer having a first surface bonded to the outer surface of the core and a second surface bonded to the inner diameter surface of the sleeve; and
   a second elastomer bonded to the outer diameter surface of the sleeve;
   wherein one of the elastomers is formed from rubber and one of the elastomers is formed from a foamed material.

2. The bushing specified in claim 1 wherein the foamed material is microcellular polyurethane.

3. The bushing specified in claim 1 wherein the foamed material is selected from a group consisting of foamed fluorocarbon, foamed highly saturated nitrite, methyl acrylate polymer foam, silicone foam, and microcellular polyurethane.

4. The bushing specified in claim 1 wherein the rubber is selected from a group consisting of natural rubber, isoprene, styrene butadiene, butyl, ethylene-acrylate, and polyacrylate.

5. The bushing specified in claim 1 wherein the first elastomer is formed from rubber and the second elastomer is formed from microcellular polyurethane.

6. The bushing specified in claim 1 wherein the second elastomer includes at least one void along the outer diameter surface of the sleeve.

7. The bushing specified in claim 1 wherein the first elastomer includes a pair of legs.

8. The bushing specified in claim 7 wherein the second elastomer includes at least two portions provided on the sleeve adjacent the pair of legs.

9. The bushing specified in claim 1 wherein one of the elastomers has a modulus to absorb high amplitude and low frequency vibrations and the other elastomer has a different modulus to absorb low amplitude and high frequency vibrations.

10. A bracket for absorbing vibrations from a vehicular powertrain, the bracket comprising:

a body having a cavity with an inner surface;

a core having an outer surface, the core received within the cavity;

a sleeve received within the cavity and surrounding the outer surface of the core, the sleeve having an inner diameter surface and an outer diameter surface;

a first elastomer having a first surface bonded to the outer surface of the core and a second surface bonded to the inner diameter surface of the sleeve; and a second elastomer having a first surface bonded to the outer diameter surface of the sleeve and a second surface bonded to the inner surface of the cavity;

wherein one of the elastomers is formed from rubber and one of the elastomers is formed from a foamed material.

11. The bracket specified in claim 10 wherein the foamed material is microcellular polyurethane.

12. The bracket specified in claim 10 wherein the foamed material is selected from a group consisting of foamed fluorocarbon, foamed highly saturated nitrite, methyl acrylate polymer foam, silicone foam, and microcellular polyurethane.

13. The bracket specified in claim 10 wherein the rubber is selected from a group consisting of natural rubber, isoprene, styrene butadiene, butyl, ethylene-acrylate, and polyacrylate.

14. The bracket specified in claim 10 wherein the first elastomer is formed from rubber and the second elastomer is formed from microcellular polyurethane.

15. The bracket specified in claim 10 wherein the second elastomer includes at least one void along the outer diameter surface of the sleeve.

16. The bracket specified in claim 10 wherein the first elastomer includes a pair of legs.

17. The bracket specified in claim 16 wherein the second elastomer includes at least two portions provided on the sleeve adjacent the pair of legs.

18. The bracket specified in claim 10 wherein one of elastomers has a modulus to absorb high amplitude and low frequency vibrations and the other elastomer has a different modulus to absorb low amplitude and high frequency vibrations.

19. A bracket for absorbing vibrations from a vehicular powertrain, the bracket comprising:

a body having a cavity with an inner surface;

a core having an outer surface, the core received within the cavity;

a first elastomer having a surface bonded to the outer surface of the core; and a second elastomer having a surface bonded to the inner surface of the cavity;

wherein one of the elastomers is formed from rubber and one of the elastomers is formed from a foamed material.

20. The bracket specified in claim 19 wherein the foamed material is microcellular polyurethane.

* * * * *